W. G. JENKINS.
BANK CAR.
APPLICATION FILED SEPT. 23, 1912.
1,092,055.
Patented Mar. 31, 1914.
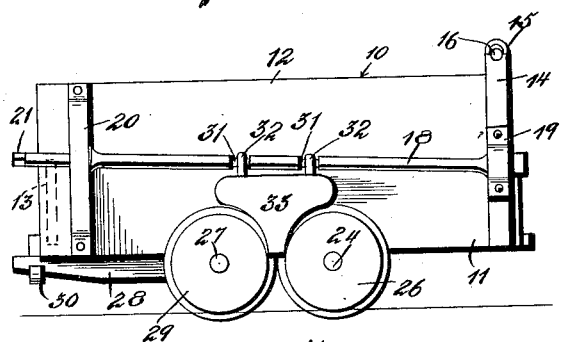
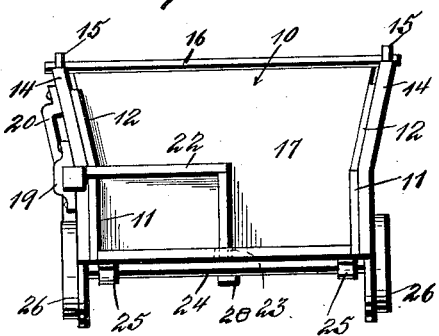
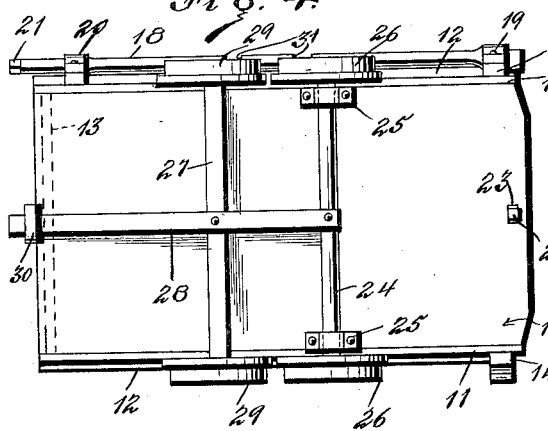
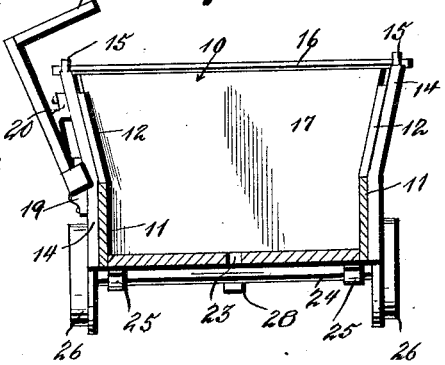
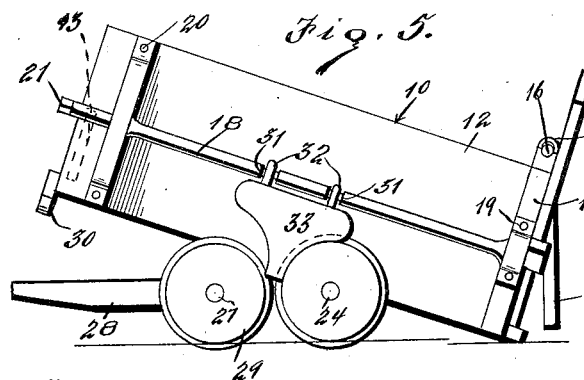
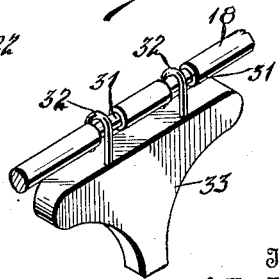
Inventor
W. G. Jenkins.

UNITED STATES PATENT OFFICE.

WILLIAM G. JENKINS, OF ANITA, PENNSYLVANIA.

BANK-CAR.

1,092,055.   Specification of Letters Patent.   Patented Mar. 31, 1914.

Application filed September 23, 1912. Serial No. 721,870.

*To all whom it may concern:*

Be it known that I, WILLIAM G. JENKINS, a citizen of the United States, residing at Anita, in the county of Jefferson, State of Pennsylvania, have invented certain new and useful Improvements in Bank - Cars; and I do hereby declare the following to be a full, clear, and exact description of the invention, such as will enable others skilled in the art to which it appertains to make and use the same.

This invention has special reference to bank cars commonly used in mines for loading and unloading coal and more especially to those hauled by mules through the mines to the tipple to be dumped into usual railroad freight cars.

The invention resides more particularly in an improved dumping and braking mechanism for the car which may be applied to dumping cars or vehicles in general and which causes the automatic application of a brake at one side of the car in going down an incline or when the car is dumped.

Another object of the invention consists in providing a brake operating between the wheels of the car, the latter being provided with a dumping door at one end which is suspended from the top of the car and swings outwardly away from the car in its dumping operation and a releasing and brake supporting bar is arranged at the side of the car for the operation of a pivoted bolt for holding the door closed or permitting it to swing open.

With the above and other objects in view, the invention consists of certain other combinations and arrangements of parts as will be hereinafter more fully described, claimed and illustrated in the accompanying drawings, in which:

Figure 1 is a side elevation of my improved bank car with the brakes disengaged from the wheels and the dumping door closed. Fig. 2 is an end elevation thereof looking toward the door. Fig. 3 is an end elevation similar to Fig. 2 but showing the pivoted locking bolt in raised position. Fig. 4 is a bottom plan view. Fig. 5 is a side elevation of the car in dumping position. Fig. 6 is a detail view showing a connection between the bolt operating bar and the brake shoes.

Referring to the drawings, in which similar reference numerals designate similar parts throughout the several views, the numeral 10 indicates the car box having the spaced parallel lower side portions 11 and the outwardly sloping upper side portions 12, though the shape of the box may be varied, at will. One end of the box is closed by a gate 13 and the other end is provided with corner posts 14 having bearing members or eyes 15 at their upper ends for pivotally receiving the extremities of a pivot 16 rigidly attached to the dumping door 17. This door moves between the sides and bottom of the box and closely conforms to the inside dimensions thereof, being pivotally or swingingly supported through the medium of the pivot 16 so as to be suspended from the top of the car and swing outwardly away from the car in the dumping action so that the lading is discharged at one end of the car.

In order to hold the door 17 in a closed position but to release it for the dumping operation, a rotatable pivoted operating bar 18 is mounted longitudinally of one side of the box, preferably at the adjoining edges of the upper and lower portions forming one side of the box, the same being pivotally or turnably mounted at one end in a bearing strap 19 and at its free end is similarly mounted and vertically movable in a bearing strap 20, from which said free extremity extends and is provided with a wrench head 21 for the application of a crank for its operation. The bar projects beyond the end of the car at which the swing door is disposed and has rigidly attached thereto a right angular locking bolt 22 engageable with an opening or recess 23 in the floor of the car and when thus engaged, serves to hold the door closed. It will thus be obvious that when the bar is rotated in one direction, the bolt is swung in an arcuate path and disengaged from the opening to permit the door to open or swing to a dumping position.

In order to permit the dumping of the box or car, the same is pivotally supported on an axle 24 by means of bearings 25 that are fixed to the car bottom and loosely receive the ends of the axle. The axle has the usual flanged wheels 26 journaled on its ends. A non-rotatable axle 27 is rigidly secured to a central longitudinal beam 28 attached rigidly at its inner end to the pivotal axle 24, flanged wheels 29 being journaled on the ends of the axle 27 close to the wheels 26 and the floor of the car box is held in contact with the axle 27 and beam 28 by a hook 30 pivoted to one end of the floor of the car and engageable beneath the free extremity of the bar to prevent the car from tilting or dumping. The operating bar 18 is provided with two spaced apart and circular reduced portions 31 rotatably engaged through bearings 32 from which is suspended a brake block 33 embodying an integral pair of shoes extending between and slightly above the wheels.

In the operation of the device, the body is so arranged that the axle 24 on which the car box is pivoted is rearward of the longitudinal center of the car box and the latter therefore returns to a horizontal position when empty. Dumping of the car is effected by turning the bar 18 and simultaneously raising the same, the brake shoes being thus disengaged from the wheels as above described and the locking bar disengaged from its opening whereupon the car will dump. During this operation, the wheels 26 will remain stationary, it being of course necessary to disengage the hook 30 from the extended end of the beam and the coal or other lading will exert pressure against the swinging door to cause it to open for dumping the contents and when released of its weight, the box will return to a supporting position and it and the door can be held by operating the hook and bolt.

I claim:

1. A bank car embodying a box, a pair of wheeled axles, a pivotal connection between said box and one of said axles permitting of said box rocking to dumping position, a swinging door for one end of said box, a brake shoe operating between the wheels of said axles, and means operatively connected with the shoe and engaging the door and holding the door closed.

2. A bank car embodying a box, a pair of wheeled axles, a pivotal connection between said box and one of said axles, a swinging door for one end of said box, a brake shoe operating upon the wheels of both axles on the same side of said box, and means operatively connected with the shoe and engaging in front of the door to hold the door closed and apply the shoe, said means serving to simultaneously release the door and the shoe to permit dumping of the contents of the box.

3. In a bank car, a pair of wheeled axles, a box pivoted on one of said axles and having a door, a brake shoe operating upon the wheels of both axles on the same side of said box, a bolt coacting with the box to hold the door closed, and a turnable and pivoted operating bar arranged on one side of the box to simultaneously release the bolt and the shoe.

4. In a bank car, a pair of wheeled axles, a box pivoted upon one of said axles and having a swinging door, a shoe operating upon the wheels of both axles on the same side of said box, a bolt coacting with the box to hold said door closed, a turnable and pivoted operating bar arranged on a side of said box and operating to simultaneously release the bolt and the shoe, and means to positively hold the car against dumping.

In testimony whereof, I affix my signature, in presence of two witnesses.

WILLIAM G. JENKINS.

Witnesses:
ENIS LEWIS,
C. L. WOLFE.

---

Copies of this patent may be obtained for five cents each, by addressing the "Commissioner of Patents, Washington, D. C."